(12) United States Patent
Roach et al.

(10) Patent No.: US 10,605,166 B2
(45) Date of Patent: Mar. 31, 2020

(54) SYSTEM AND METHOD FOR VARIABLE GEOMETRY MECHANISM CONTROL

(71) Applicant: PRATT & WHITNEY CANADA CORP., Longueuil (CA)

(72) Inventors: Andrew Roach, Brampton (CA); Wai-Lyn Wong, Toronto (CA); Sebastian Jaehun Kim, Thornhill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 47 days.

(21) Appl. No.: 15/952,921

(22) Filed: Apr. 13, 2018

(65) Prior Publication Data

US 2019/0032557 A1 Jan. 31, 2019

Related U.S. Application Data

(60) Provisional application No. 62/485,174, filed on Apr. 13, 2017.

(51) Int. Cl.
| | | |
|---|---|---|
| *F02C 7/057* | (2006.01) | |
| *F02C 7/042* | (2006.01) | |
| *B64D 33/02* | (2006.01) | |
| *F02C 9/20* | (2006.01) | |

(52) U.S. Cl.
CPC .............. *F02C 7/057* (2013.01); *B64D 33/02* (2013.01); *F02C 7/042* (2013.01); *F02C 9/20* (2013.01); *F05D 2220/323* (2013.01); *F05D 2270/20* (2013.01); *F05D 2270/301* (2013.01); *F05D 2270/303* (2013.01); *F05D 2270/331* (2013.01)

(58) Field of Classification Search
CPC . F02C 7/057; F02C 9/20; F02C 7/042; B64D 33/02; F05D 2270/331; F05D 2220/323; F05D 2270/303; F05D 2270/301; F05D 2270/20
USPC .......................................................... 701/3
See application file for complete search history.

(56) References Cited

U.S. PATENT DOCUMENTS

| | | |
|---|---|---|
| 8,452,516 B1 | 5/2013 | Rose et al. |
| 2016/0186667 A1 | 6/2016 | Kupratis |
| 2017/0107914 A1* | 4/2017 | Lu ............................ F02C 9/54 |

* cited by examiner

*Primary Examiner* — Brian P Sweeney
(74) *Attorney, Agent, or Firm* — Norton Rose Fulbright Canada LLP

(57) ABSTRACT

A system and method for controlling a variable inlet geometry mechanism of an aircraft engine. At least one first input signal indicative of at least one operating parameter of an aircraft engine is received. At least one second input signal indicative of a level of crosswind experienced by the aircraft and of an airspeed of the aircraft being below a predetermined threshold is received. A schedule is determined for positioning a the variable inlet geometry mechanism based on the at least one first input signal and of the at least one second input signal. The variable inlet geometry mechanism is then positioned in accordance with the schedule.

23 Claims, 5 Drawing Sheets

SYSTEM AND METHOD FOR VARIABLE GEOMETRY MECHANISM CONTROL

CROSS-REFERENCE TO RELATED APPLICATIONS

The present application claims priority under 35 U.S.C. 119(e) of Provisional Patent Application bearing Ser. No. 62/485,172 filed on Apr. 13, 2017, the contents of which are hereby incorporated by reference.

TECHNICAL FIELD

The application relates generally to controlling the operation of engines, and more particularly to determining variable geometry mechanism (VGM) schedules.

BACKGROUND OF THE ART

Gas turbine engines for use in aircraft typically comprise a variable geometry mechanism (VGM), such as inlet guide vanes (IGVs), whose variable positioning may be controlled according to a schedule to optimize compressor efficiency and minimize engine fuel burn. Known control systems typically provide a common schedule amongst all engines, regardless of engine position or behaviour. This however limits engine operability and performance.

There is therefore a need for an improved system and method for variable geometry mechanism control.

SUMMARY

In one aspect, there is provided a method for controlling a variable inlet geometry mechanism of an aircraft engine. The method comprises receiving at least one first input signal indicative of at least one operating parameter of the engine, receiving at least one second input signal indicative of a level of crosswind experienced by the aircraft and of an airspeed of the aircraft being below a predetermined threshold, determining, based on the at least one first input signal and of the at least one second input signal, a schedule for positioning the variable inlet geometry mechanism, and positioning the variable inlet geometry mechanism in accordance with the schedule.

In another aspect, there is provided a system for controlling a variable inlet geometry mechanism of an aircraft engine. The system comprises a memory and a processing unit coupled to the memory and configured to receive at least one first input signal indicative of at least one operating parameter of the engine, receive at least one second input signal indicative of a level of crosswind experienced by the aircraft and of an airspeed of the aircraft being below a predetermined threshold, determine, based on the at least one first input signal and the at least one second input signal, a schedule for positioning the variable inlet geometry mechanism, and positioning the variable inlet geometry mechanism in accordance with the schedule.

In a further aspect, there is provided a non-transitory computer readable medium having stored thereon program code executable by at least one processor for receiving at least one first input signal indicative of at least one operating parameter of an aircraft engine, receiving at least one second input signal indicative of a level of crosswind experienced by the aircraft and of an airspeed of the aircraft being below a predetermined threshold, determining, based on at least one first input signal and of the at least one second input signal, a schedule for positioning a variable inlet geometry mechanism of the engine, and positioning the variable inlet geometry mechanism in accordance with the schedule.

DESCRIPTION OF THE DRAWINGS

Reference is now made to the accompanying figures in which.

DETAILED DESCRIPTION

Figure 1:
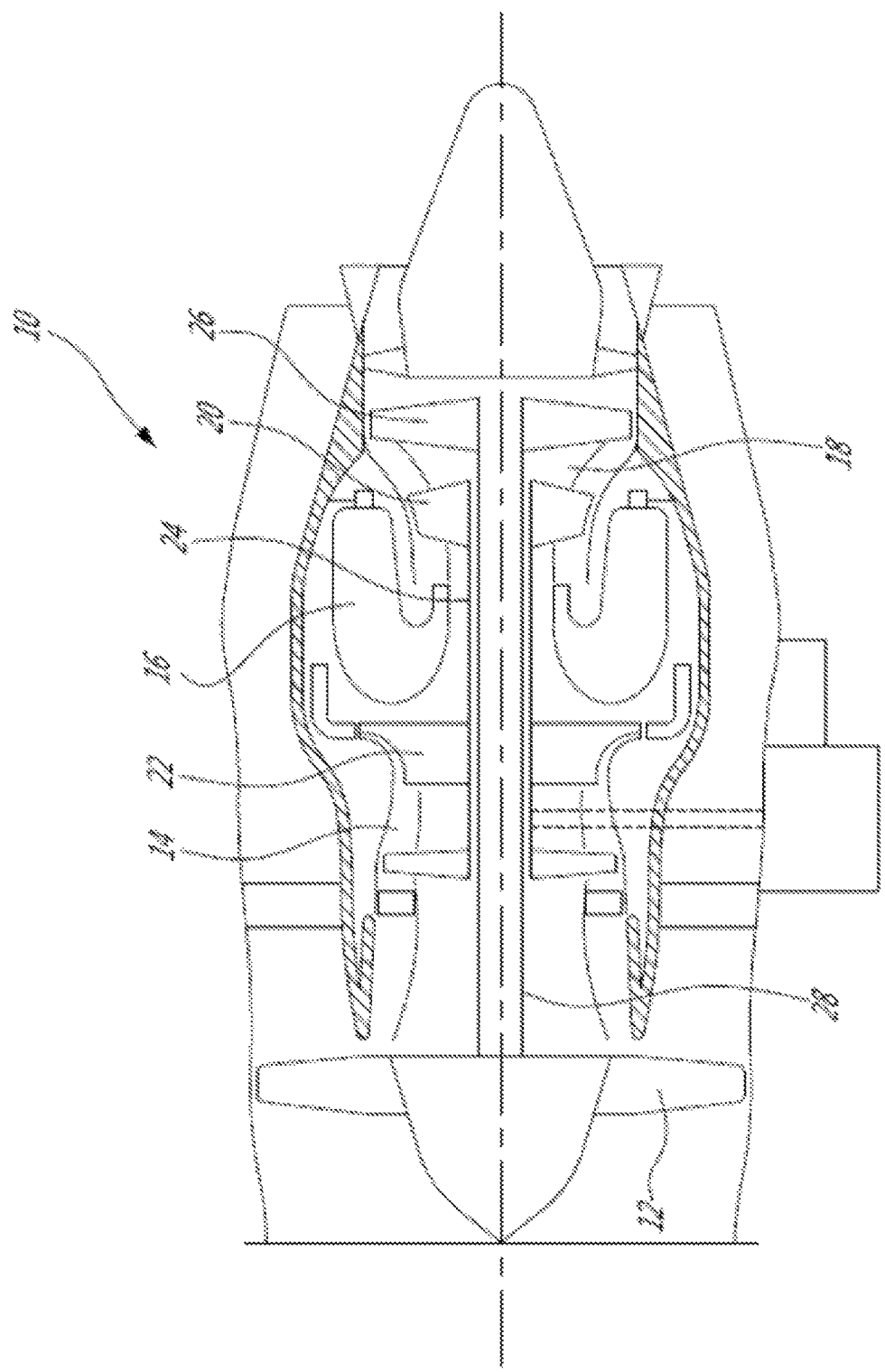
FIG. 1 is a schematic cross-sectional view of a gas turbine engine, in accordance with an illustrative embodiment.

FIG. 1 illustrates a gas turbine engine 10 of a type preferably provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply.

Figure 2:
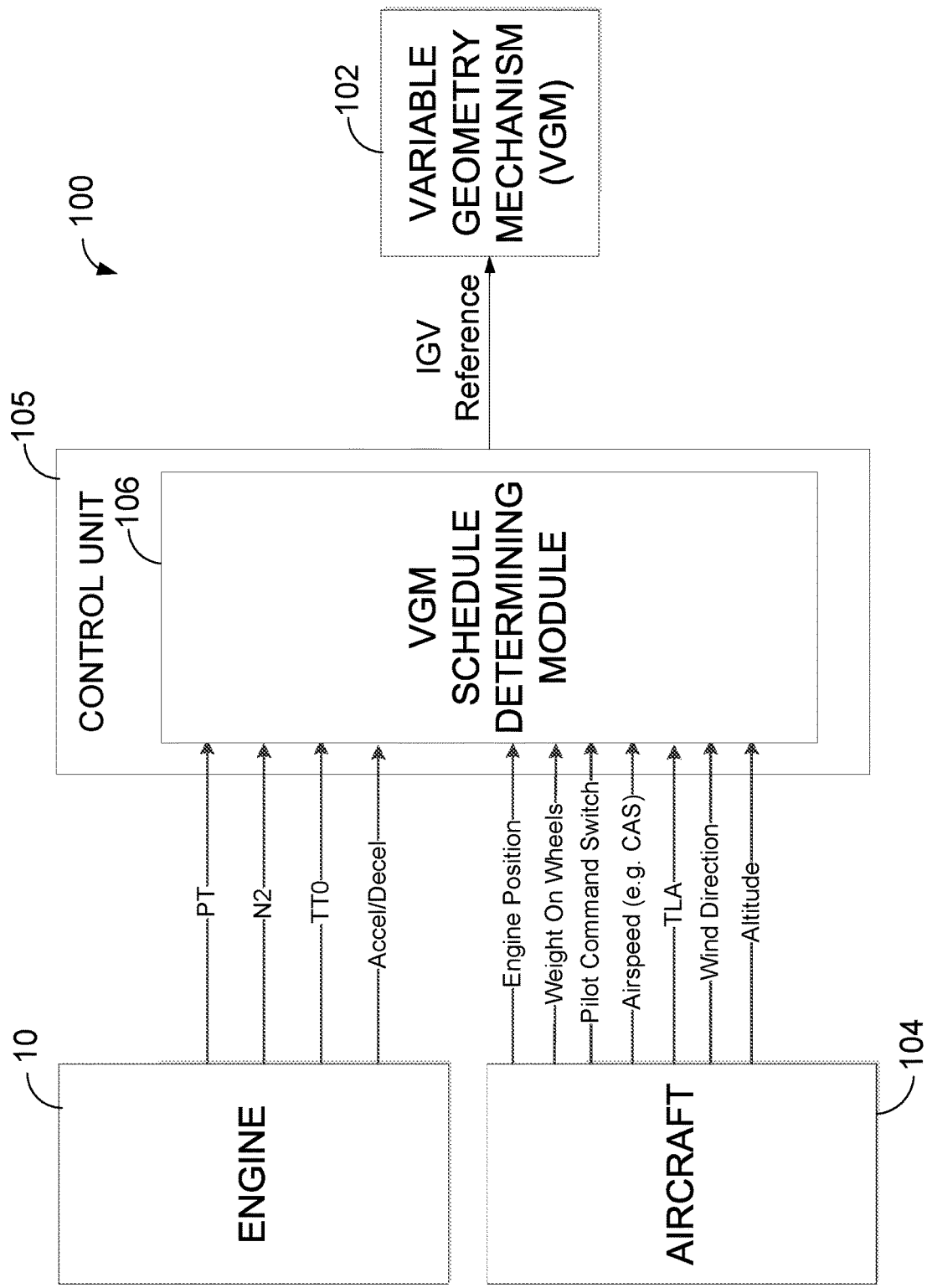
FIG. 2 is a block diagram of a system for variable geometry mechanism (VGM) control, in accordance with an illustrative embodiment.

Referring now to FIG. 2, a system 100 for controlling the engine 10, particularly a VGM 102 thereof will now be described. In one embodiment, the VGM 102 comprises a variable inlet geometry mechanism, e.g. inlet guide vanes (IGVs) moveable for directing air into the compressor section 12 (e.g. compressor inlet guide vanes). For example, the VGM 102 may comprise low-pressure compressor inlet guide vanes, mid-pressure compressor inlet guide vanes, and/or high-pressure compressor inlet guide vanes. It should however be understood that the VGM 102 may in some embodiments consist of outlet guide vanes for directing air out of the compressor section 12, variable stator vanes for directing incoming air into rotor blades (not shown) of the engine 10, variable nozzles, and the like. Using the system 100, the angle of the VGM 102 is controlled between a closed setting and one or more open settings, thereby improving engine operability. As will be discussed further below, it should also be understood that, although a single engine 10 has been illustrated herein for clarity purposes, the system 100 may be used to control selection of the appropriate VGM schedules for a plurality of engines as in 10 of a given aircraft. For example, the system and method described herein may apply to aircraft having two (2), three (3), or four (4) engines.

The system 100 illustratively comprises a control unit 105, which is coupled to the engine 10 and aircraft 104 and may comprise a digital computer or Electronic Engine Controller (EEC) (not shown) using a Central Processing Unit (CPU) (not shown). The control unit 105 illustratively includes a VGM schedule selection module 106, which is configured to select the appropriate VGM schedule(s) in accordance with a number of thresholds and/or conditions. As will be discussed further below, in one embodiment, the appropriate VGM schedule for a particular engine 10 is selected based on aircraft forward speed, with the thresholds and/or conditions for selection of the appropriate VGM schedule(s) being set based on installed measurements and behaviour of the engine 10 when subjected to field operation under various ambient conditions. The VGM schedule(s) used for different airspeeds are also dependent on each engine's installed position (e.g. left, right, or center) on the aircraft such that each engine 10 uses a different VGM schedule. For example, for a tri-jet aircraft (i.e. having three (3) engines as in 10), three (3) different VGM schedules may be provided instead of a common VGM schedule being used for all three (3) engines. In this case, the VGM schedule determining module 106 illustratively selects the VGM schedules such that the center engine uses a different VGM schedule than the side (i.e. left and right) engines. In one embodiment, using the system 100, engine tolerance to crosswind induced inlet distortion can be improved and engine operability may be optimized without compromising engine performance at different points in the flight envelope.

In operation, the VGM schedule determining module 106 receives one or more input signals on the basis of which the VGM schedule determining module 106 determines the VGM schedule(s) appropriate for the current operational conditions. In one embodiment, the VGM schedule determining module 106 receives one or more first input signals indicative of operating parameters (e.g. of a behaviour) of the engine 10. The first input signal(s) may be received directly from the engine 10 or from alternate sources. In one embodiment, the first input signal(s) include, but are not limited to, a PT signal indicative of a total pressure of the engine 10, an N2 signal indicative of a rotational speed of the engine 10, a TTO signal indicative of a total temperature of the engine 10, and an Accel/Decel signal indicative of a current acceleration or deceleration of the engine 10.

In addition to the first input signals, the VGM schedule determining module 106 also receives one or more second input signals, which may be received from the aircraft 104 (as illustrated), and are indicative of parameters or factors, which are distinct from the operating parameters of the engine 10 and relate to the performance (e.g. speed or acceleration) of the aircraft and/or the operating environment of the aircraft (e.g. weather, temperature, air pressure, altitude, and the like). In one embodiment, the second input signal(s) are indicative of operating parameter(s) of the aircraft 104. The second input signal(s) illustratively provide an indication of a level of crosswind (e.g. low crosswind, high crosswind, no crosswind) experienced by the aircraft 104. The second input signal(s) also illustratively provide an indication that the airspeed of the aircraft 104 is below a predetermined threshold (e.g. that the aircraft 104 is operating at low speed), meaning for example that the aircraft 104 is still or taxiing. The second input signal(s) may be received from the airframe (e.g. as input by the pilot of the aircraft) and allow to schedule the VGM 102 based on aircraft-related factors external from the engine 10. The first and second input signal(s) may be produced by one or more sensing devices, such as physical or virtual sensors, meters, and the like.

In one embodiment, the second input signals provide an indication of the relative speed of the aircraft 104. The second input signals include, but are not limited to, an Engine Position signal indicative of the position (e.g. left, right, center) of the engine 10 on the aircraft, a Weight On Wheels (WOW) signal indicative of whether the aircraft has weight on its wheels (e.g. is on the ground or airborne), a Pilot Command Switch signal indicative of pilot input, an Airspeed signal (e.g. calibrated airspeed signal or CAS) indicative of the aircraft airspeed (e.g. forward airspeed), a Thrust Level Angle (or TLA) signal indicative of the physical position of the thrust lever, a Wind Direction signal indicative of the current direction and speed of the wind, and an altitude signal indicative of a current altitude of the aircraft. Using the data obtained from the second input signal(s), it becomes possible to accommodate aircraft system behavior for crosswinds. In one embodiment, accommodation for crosswinds is performed when the aircraft 104 is on the ground.

It should be understood that the number and/or combination of second input signals received by the VGM schedule determining module 106 may vary depending on the configuration of the engine 10 and/or aircraft 104. For example, depending on the availability of the input signals, any combination of the Engine Position signal, the WOW signal, the Pilot Command Switch signal, the Airspeed signal, the TLA signal, the Wind Direction signal, and the altitude signal may be used by the VGM schedule determining module 106 to determine the VGM schedule. The VGM schedule determining module 106 may also determine the VGM schedule solely based on the Engine Position signal, the WOW signal, and the Airspeed signal. Other embodiments may apply depending on the engine requirements.

The VGM schedule determining module 106 then processes the received first and second input signals to generate an output signal (referred to herein as "VGM Reference"), which indicates the commanded VGM position. In one embodiment, the VGM schedule determining module 106 dynamically computes the appropriate VGM schedule(s) based on the received input signals and on conditions perceived by the EEC and generates the "VGM Reference" signal accordingly. In this case, the VGM schedule determining module 106 computes the VGM schedule for any given engine using one or more equations, which are based on the received input data and are each specific to the given engine.

In another embodiment, depending on the received input signals and on conditions perceived by the EEC, the VGM schedule determining module 106 queries a memory communicatively coupled to the EEC and retrieves from the memory one or more VGM tables from which the VGM schedule(s) suited to the current flight conditions can be determined. The memory indeed stores a plurality of VGM tables, which each includes pre-determined values and parameters (e.g. IGV angles) derived through testing and analysis. In particular, each VGM table comprises a number of entries that each associates VGM positions with one or more predetermined thresholds or conditions (e.g. flight conditions, such as altitude, or engine parameters, such as total pressure and compressor speed) for VGM schedule selection. The VGM schedule determining module 106 may then determine the appropriate VGM schedule based on the result of the interpolation and generate the "VGM Reference" signal accordingly. In particular, upon determining the engine's position from the received input signals, the VGM schedule determining module 106 may first select the applicable VGM tables. The VGM schedule determining module 106 may then perform an interpolation between the selected VGM tables based on a given parameter (e.g. a parameter or factor external from the engine, such as forward airspeed, as received from the aircraft input signal(s)). The appropriate VGM schedule may then be determined accordingly and the "VGM Reference" signal generated.

In one embodiment, for a given engine configuration, the VGM schedule determining module 106 may be configured to universally close the VGM (e.g. all IGVs) when the aircraft is on the ground and in high crosswinds. In particular, upon receiving the input signal(s), the VGM schedule determining module 106 may determine that the aircraft 104 is on the ground and experiencing crosswinds exceeding a predetermined threshold. The VGM schedule determining module 106 then determines (e.g. upon applying relevant equation(s) or upon querying the VGM table(s) using the input data received from the engine 10 and the aircraft 104) that the IGVs are to be closed and accordingly generates the "VGM Reference" signal to cause closing of all IGVs.

As discussed above, the systems and methods described herein may be used to control VGM schedule determining for aircraft comprising several engines as in 10. In particular, for multi-engine aircraft, the VGM schedules determined by the VGM schedule determining module 106 are dependent on the installed position (e.g. left, right, or center) of each engine 10 such that each engine 10 uses a different VGM schedule. For example, in one embodiment where the aircraft comprises three (3) engines, i.e. a left engine, a right engine, and a center engine, the memory may have stored therein a first VGM table to be used when the side engines are operating at high airspeed, a second VGM table to be used when the side engines are operating at low airspeed, a third VGM table to be used when the center engine is operating at high airspeed, and a fourth VGM table to be used when the center engine is operating at low airspeed. It should be understood that, two (2) sets of VGM tables may also be provided for the side engines, namely a first set for the left engine and a second set for the right engine. As discussed above, for inputs that are not static (e.g. airspeed) and whose status may vary over time, the VGM schedule determining module 106 may use (e.g. interpolate between) data from several VGM tables (e.g. uses the VGM tables for low airspeed conditions together with the VGM tables for high airspeed conditions) to determine the VGM schedule.

Once the appropriate VGM schedule has been determined, the VGM schedule determining module 106 then outputs the "VGM Reference" signal to the VGM 102. The VGM 102 (e.g. the IGVs) is in turn positioned (e.g. the angle thereof adjusted) in accordance with the VGM schedule, as required by real time flight condition measurements.

Figure 3:
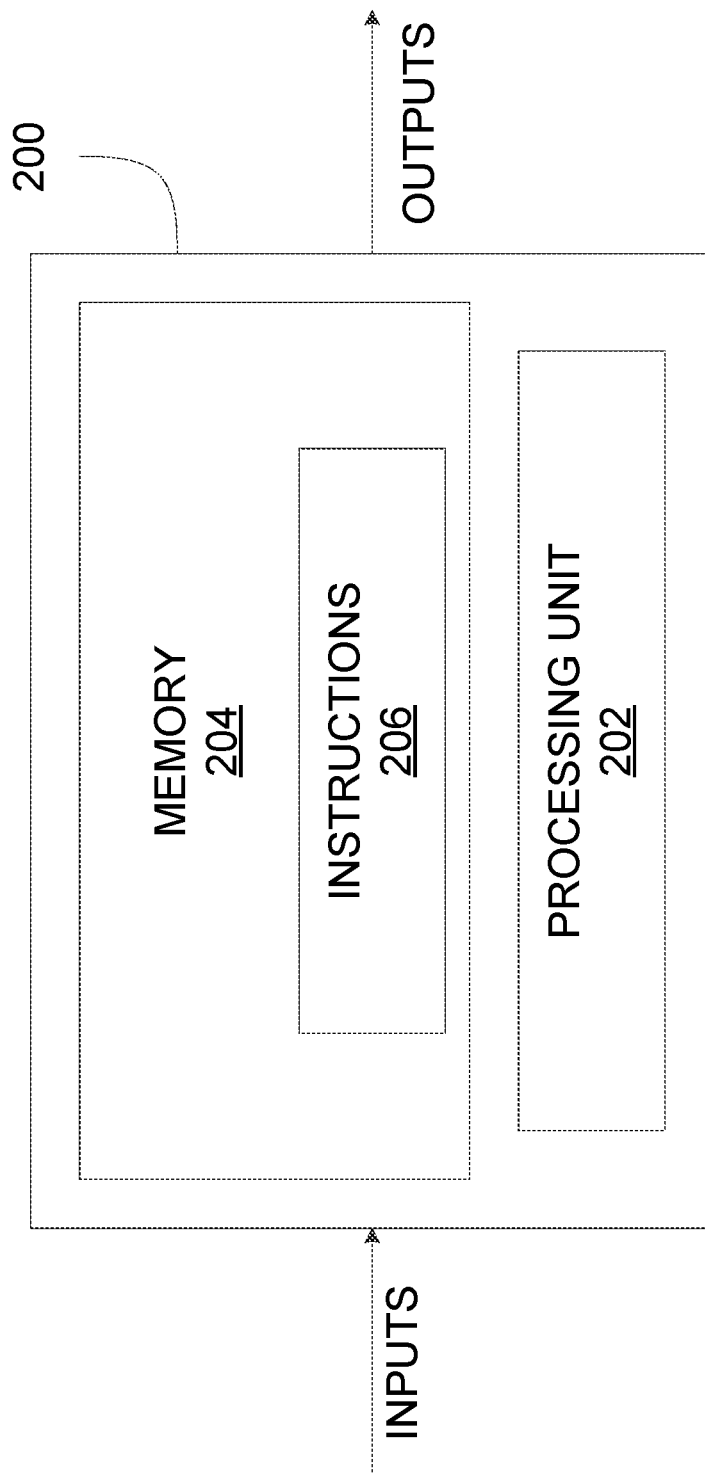
FIG. 3 is a block diagram of a computing device for implementing the VGM schedule determining module of FIG. 2, in accordance with an illustrative embodiment.

FIG. 3 is an example embodiment of a computing device 200 for implementing the control unit 105, particularly the VGM schedule determining module 106 described above with reference to FIG. 2. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 4:
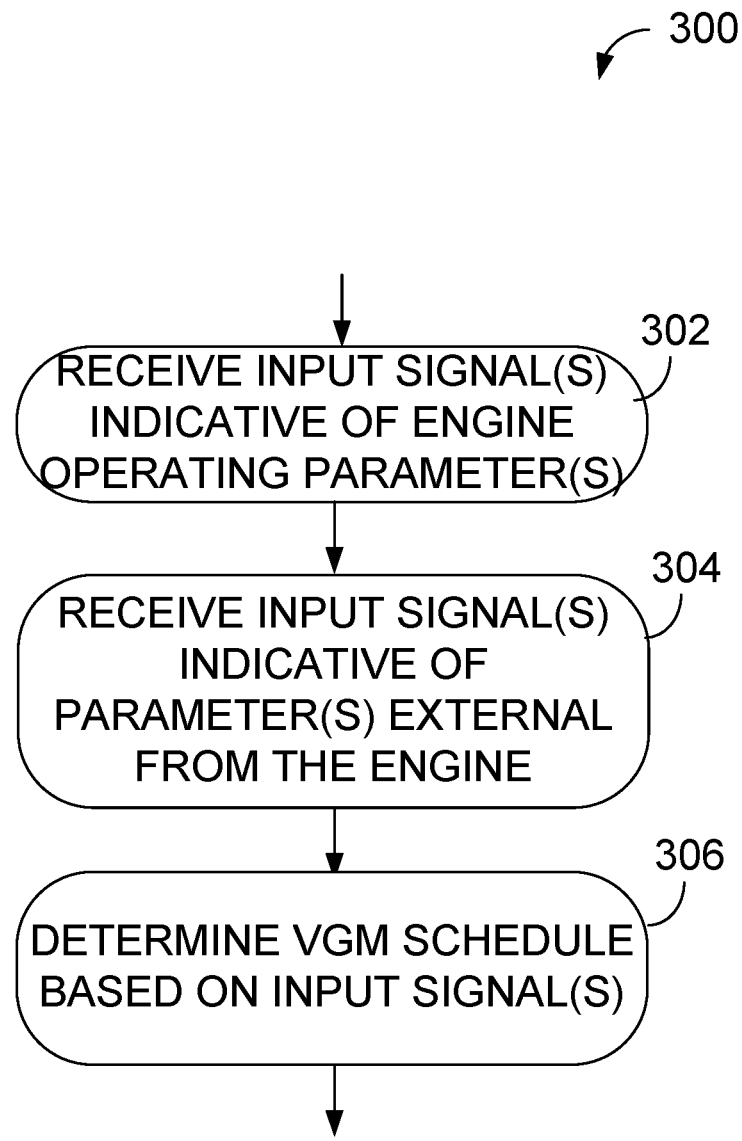
FIG. 4 is a flowchart of a method for determining a VGM schedule, in accordance with an illustrative embodiment.

Referring now to FIG. 4, an example method 300 for determining a VGM schedule will now be described. The method 300 may be implemented by the computing device 200 of FIG. 3. The method 300 comprises receiving at step 302 one or more first input signals indicative of one or more engine operating parameters and receiving at step 304 one or more second input signals indicative of one or more parameters or factors external from the engine (i.e. distinct from the engine operating parameters). As discussed above, in one embodiment, the first input signal(s) received at step 302 indicate at least one of a pressure, a rotational speed, a temperature, an acceleration, and a deceleration of at least one engine provided on an aircraft. As also discussed above, the second input signal(s) may be received from the pilot/ airframe and allow to schedule the VGM based on factors, which are external from the engine 10. The second input signal(s) illustratively indicate the level of crosswind affecting the aircraft and that the airspeed of the aircraft is below a predetermined threshold (e.g. that the aircraft is operating at low speed). In this manner, adjustment to crosswind situations can be achieved by selecting and adjusting the VGM schedule(s) accordingly. In one embodiment, the second input signal(s) indicate a position of the at least one engine, whether the aircraft is on the ground or airborne, an airspeed of the aircraft, an altitude of the aircraft, a wind speed and direction, a position of a thrust lever, and a position of a pilot command switch. The next step 306 is then to process the received input signals to determine the appropriate VGM schedules based on the first and second input signal(s). As discussed above, this may entail performing computations using engine-specific equations or querying a memory to retrieve therefrom appropriate VGM tables from which the appropriate VGM schedule(s) can be determined.

Figure 5:
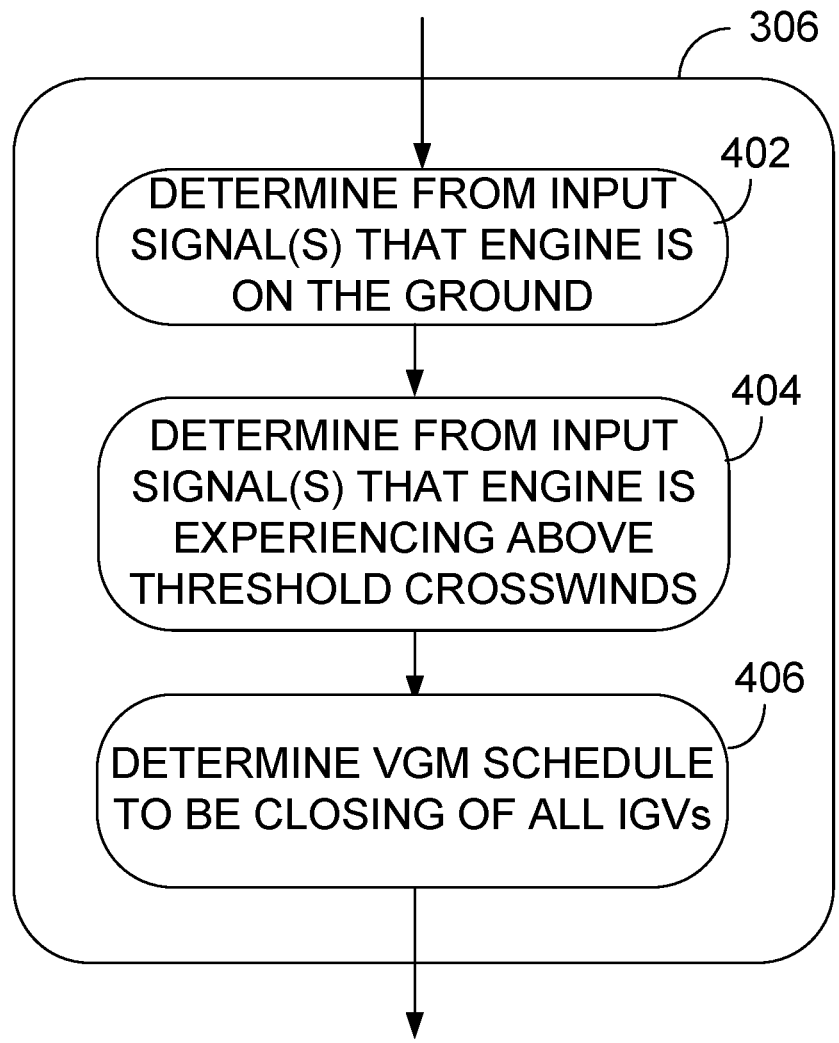
FIG. 5 is a flowchart of the step of FIG. 4 of determining a VGM schedule based on input signal(s), in accordance with an illustrative embodiment.

Referring now to FIG. 5 in addition to FIG. 4, in one embodiment, step 306 comprises determining from the receiving input signal(s) that the engine is on the ground (step 402) and that the engine is experiencing above-threshold (i.e. high) crosswinds (step 404). As a result, it is determined at step 406 that the appropriate VGM schedule is to universally close the VGM (e.g. all IGVs).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for controlling a variable inlet geometry mechanism of an aircraft engine, the method comprising:
   receiving, at a control unit, at least one first input signal indicative of at least one operating parameter of the engine;
   receiving, at the control unit, at least one second input signal indicative of a level of crosswind experienced by the aircraft and of an airspeed of the aircraft being below a predetermined threshold;
   determining, at the control unit, based on the at least one first input signal and the at least one second input signal, a schedule for positioning the variable inlet geometry mechanism; and
   outputting, at the control unit, a control signal for causing the variable inlet geometry mechanism to be positioned in accordance with the schedule.

2. The method of claim 1, wherein the at least one first input signal is indicative of at least one of a pressure, a rotational speed, a temperature, an acceleration, and a deceleration of the engine.

3. The method of claim 1, wherein the at least one second input signal is indicative of at least one of an installed position of the engine on the aircraft, whether the aircraft is on the ground or airborne, the airspeed of the aircraft, an altitude of the aircraft, a wind speed and direction, a position of a thrust lever, and a position of a pilot command switch.

4. The method of claim 3, further comprising determining from the at least one second input signal that the aircraft is on the ground and experiencing a crosswind exceeding a predetermined threshold, and wherein determining the schedule comprises determining that the variable inlet geometry mechanism is to be moved to a closed setting.

5. The method of claim 4, wherein determining the schedule comprises querying a memory to retrieve therefrom at least one table comprising a plurality of entries each associating a variable inlet geometry mechanism position with a predetermined condition for selection of the variable inlet geometry mechanism position, and correlating the at least one first input signal and the at least one second input signal with the plurality of entries to determine that the variable inlet geometry mechanism position is the closed setting.

6. The method of claim 4, wherein positioning the variable inlet geometry mechanism in accordance with the schedule comprises positioning the variable inlet geometry mechanism at the closed setting.

7. The method of claim 4, wherein the schedule is determined for positioning the variable inlet geometry mechanism comprising a plurality of compressor inlet guide vanes.

8. The method of claim 1, wherein determining the schedule comprises querying a memory to retrieve therefrom at least one table comprising a plurality of entries each associating a variable inlet geometry mechanism position with a predetermined condition for selection of the variable inlet geometry mechanism position, and correlating the at least one first input signal and the at least one second input signal with the plurality of entries to determine the schedule.

9. The method of claim 8, wherein the schedule is determined for positioning the variable inlet geometry mechanism of a plurality of engines installed on the aircraft.

10. The method of claim 9, wherein the schedule is determined for a left engine, a right engine, and a center engine by querying the memory to retrieve therefrom the at least one table comprising at least one first table for use when the center engine is operating at an airspeed above a first predetermined threshold, at least one second table for use when the center engine is operating at an airspeed below the first predetermined threshold, at least one third table for use when the left engine or the right engine is operating at an airspeed above a second predetermined threshold, and at least one fourth table for use when left engine or the right engine is operating at an airspeed below the second predetermined threshold.

11. The method of claim 10, wherein determining the schedule comprises, for each of the left engine, the right engine, and the center engine, determining from the at least one second input signal an installed position of the engine, selecting applicable ones of the at least one first, second, third, and fourth table accordingly, and performing, based on the airspeed of the aircraft, an interpolation between the applicable tables to determine the schedule.

12. The method of claim 1, wherein the schedule is determined for positioning the variable inlet geometry mechanism comprising at least one of a plurality of low-pressure compressor inlet guide vanes, a plurality of mid-pressure compressor inlet guide vanes, and a plurality of high-pressure compressor inlet guide vanes.

13. A system for controlling a variable inlet geometry mechanism of an aircraft engine, the system comprising:
   a memory; and
   a processing unit coupled to the memory and configured to:
   receive at least one first input signal indicative of at least one operating parameter of the engine and of an airspeed of the aircraft being below a predetermined threshold;
   receive at least one second input signal indicative of a level of crosswind experienced by the aircraft;
   determine, based on the at least one first input signal and the at least one second input signal, a schedule for positioning the variable inlet geometry mechanism; and
   outputting a control signal for causing the variable inlet geometry mechanism to be positioned in accordance with the schedule.

14. The system of claim 13, wherein the processing unit is configured to receive the at least one input signal indicative of at least one of a pressure, a rotational speed, a temperature, an acceleration, and a deceleration of the engine.

15. The system of claim 13, wherein the processing unit is configured to receive the at least one second input signal indicative of at least one of an installed position of the engine on the aircraft, whether the aircraft is on the ground or airborne, the airspeed of the aircraft, an altitude of the aircraft, a wind speed and direction, a position of a thrust lever, and a position of a pilot command switch.

16. The system of claim 15, wherein the processing unit is configured to determine from the at least one second input signal that the aircraft is on the ground and experiencing a crosswind exceeding a predetermined threshold, and to determine the schedule comprising determining that the variable inlet geometry mechanism is to be moved to a closed setting.

17. The system of claim 16, wherein the processing unit is configured to determine the schedule comprising querying a memory to retrieve therefrom at least one table comprising a plurality of entries each associating a variable inlet geometry mechanism position with a predetermined condition for selection of the variable inlet geometry mechanism position, and correlating the at least one first input signal and the at least one second input signal with the plurality of entries to determine that the variable geometry mechanism position is the closed setting.

18. The system of claim 16, wherein the processing unit is configured for positioning the variable inlet geometry mechanism at the closed setting.

19. The system of claim 16, wherein the processing unit is configured to determine the schedule for positioning the variable inlet geometry mechanism comprising a plurality of compressor inlet guide vanes.

20. The system of claim 13, wherein the processing unit is configured to determine the schedule by querying a memory to retrieve therefrom at least one table comprising a plurality of entries each associating a variable inlet geometry mechanism position with a predetermined condition for selection of the variable inlet geometry mechanism position, and correlating the at least one first input signal and the at least one second input signal with the plurality of entries to determine the schedule.

21. The system of claim 20, wherein the processing unit is configured to determine the schedule for a left engine, a right engine, and a center engine by querying the memory to retrieve therefrom the at least one table comprising at least one first table for use when the center engine is operating at an airspeed above a first predetermined threshold, at least one second table for use when the center engine is operating at an airspeed below the first predetermined threshold, at least one third table for use when the left engine or the right engine is operating at an airspeed above a second predetermined threshold, and at least one fourth table for use when the left engine or the right engine is operating at an airspeed below the second predetermined threshold.

22. The system of claim 21, wherein the processing unit is configured to determine the schedule comprising, for each of the left engine, the right engine, and the center engine, determining from the at least one second input signal an installed position of the engine, selecting applicable ones of the at least one first, second, third, and fourth table accordingly, and performing, based on the airspeed of the aircraft, an interpolation between the applicable tables to determine the schedule.

23. A non-transitory computer readable medium having stored thereon program code executable by at least one processor for:
receiving at least one first input signal indicative of at least one operating parameter of an aircraft engine;
receiving at least one second input signal indicative of a level of crosswind experienced by the aircraft and of an airspeed of the aircraft being below a predetermined threshold;
determining, based on at least one first input signal and the at least one second input signal, a schedule for a positioning a variable inlet geometry mechanism of the engine; and
outputting a control signal for causing the variable inlet geometry mechanism to be positioned in accordance with the schedule.

\* \* \* \* \*